(12) United States Patent
Ju et al.

(10) Patent No.: US 11,391,661 B2
(45) Date of Patent: Jul. 19, 2022

(54) THREE-DIMENSIONAL PORE STRUCTURE MODEL AND METHOD FOR FABRICATING THE SAME, EXPERIMENT SYSTEM AND TRANSPARENT EXPERIMENT METHOD FOR REPLICATING FLUID DISPLACEMENT PROCESS WITHIN ROCK PORE STRUCTURE

(71) Applicant: CHINA UNIVERSITY OF MINING AND TECHNOLOGY, BEIJING, Beijing (CN)

(72) Inventors: Yang Ju, Beijing (CN); Wenbo Gong, Beijing (CN); Jiangtao Zheng, Beijing (CN); Chaodong Xi, Beijing (CN); Changbing Wan, Beijing (CN)

(73) Assignee: CHINA UNIVERSITY OF MINING AND TECHNOLOGY, BEIJING, Beijing (CN)

(*) Notice: Subject to any disclaimer, the term of this patent is extended or adjusted under 35 U.S.C. 154(b) by 296 days.

(21) Appl. No.: 16/753,806

(22) PCT Filed: Nov. 7, 2018

(86) PCT No.: PCT/CN2018/114285
§ 371 (c)(1),
(2) Date: Apr. 6, 2020

(87) PCT Pub. No.: WO2020/093262
PCT Pub. Date: May 14, 2020

(65) Prior Publication Data
US 2021/0208051 A1 Jul. 8, 2021

(51) Int. Cl.
*G01N 15/08* (2006.01)
*B33Y 50/02* (2015.01)
(Continued)

(52) U.S. Cl.
CPC ......... *G01N 15/082* (2013.01); *B29C 64/393* (2017.08); *B33Y 50/02* (2014.12); *B33Y 80/00* (2014.12); *G01N 2015/0846* (2013.01)

(58) Field of Classification Search
CPC ...... G01N 15/00; G01N 15/08; G01N 15/082; G01N 2015/0846; B29C 64/393; B33Y 50/02; B33Y 80/00
See application file for complete search history.

(56) References Cited

U.S. PATENT DOCUMENTS 10,656,068 B2 * 5/2020 León .................. G01N 15/08

FOREIGN PATENT DOCUMENTS

CN 202947950 U 5/2013
CN 106053168 A 10/2016
(Continued)

OTHER PUBLICATIONS

"Simulation and Validation of Porosity and Permeability of Synthetic and Real Rock Models Using Three-Dimensional Printing and Digital Rock Physics" Ibrahim et al. ACS Omega, 2021, 6, 47, 31775-31781; Nov. 16, 2021 (Year: 2021).*

(Continued)

*Primary Examiner* — Nguyen Q. Ha
(74) *Attorney, Agent, or Firm* — Yue (Robert) Xu; Apex Attorneys at Law, LLP

(57) ABSTRACT

An experiment system and transparent experiment method for replicating fluid displacement in a pore structure of a natural rock mass are provided. The natural pore structure is extracted and a digital porous model corresponding to the natural rock mass is reconstructed with the image processing method. Based on the digital porous model, a three-dimensional pore structure model with a transparent and visible (Continued)

internal structure is printed by a 3D printing device, such that the pore space inside the three-dimensional pore structure model is visible. In this way, the whole fluid flow during the displacement-seepage process within the natural rock mass can be replicated and visually observed from the outside when performing the displacement-seepage experiment. Further, temperature, flow rate, and pressure can be accurately controlled, to replicate various experiment conditions, so as to perform quantitative analysis on distribution features of a seepage field and a fluid speed field.

11 Claims, 4 Drawing Sheets

(51) Int. Cl.
*B33Y 80/00* (2015.01)
*B29C 64/393* (2017.01)

(56) References Cited

FOREIGN PATENT DOCUMENTS

| | | |
|---|---|---|
| CN | 106645158 A | 5/2017 |
| CN | 107991305 A | 5/2018 |
| WO | 2005104002 A1 | 11/2005 |
| WO | 2016007170 A1 | 1/2016 |

OTHER PUBLICATIONS

International Search Report for PCT/CN2019/085917 dated Jul. 25, 2019, ISA/CN.

Yang Ju etc., Visualization of the complex structure and stress field inside rock by means of 3D printing technology, Science China Press, vol. 59, No. 32, Nov. 30, 2014, ISSN:0023-074X, pp. 3111-3112.

First Examination Report dated Mar. 30, 2021 for Australian patent application No. 2018444642.

\* cited by examiner

THREE-DIMENSIONAL PORE STRUCTURE MODEL AND METHOD FOR FABRICATING THE SAME, EXPERIMENT SYSTEM AND TRANSPARENT EXPERIMENT METHOD FOR REPLICATING FLUID DISPLACEMENT PROCESS WITHIN ROCK PORE STRUCTURE

The present application is a national phase of International Patent Application No. PCT/CN2018/114285, titled "THREE-DIMENSIONAL PORE STRUCTURE MODEL AND METHOD FOR FABRICATING THE SAME, EXPERIMENT SYSTEM AND TRANSPARENT EXPERIMENT METHOD FOR REPLICATING FLUID DISPLACEMENT PROCESS WITHIN ROCK PORE STRUCTURE", filed on Nov. 7, 2018 with the Chinese Patent Office, which is incorporated herein by reference in its entirety.

FIELD

The present disclosure relates to the technical field of researches on permeability of natural rock masses, and in particular to reproducing a three-dimensional pore structure model for a rock mass structure and a method fabricating the same, an experiment system and a transparent experiment method for replicating a fluid displacement process within natural rock pore structure.

BACKGROUND

A displacement-seepage process of immiscible fluids in a complex pore structure is common and important in the engineering field. For example, the displacement-seepage process may occur in systems such as an oil-gas-water three-phase coexistent system in an unconventional tight hydrocarbon reservoir, a $CO_2$ geological storage system in an aquifer, a system for processing nuclear waste and transporting groundwater pollutants. In a unconventional tight oil reservoir with a hydraulic fracturing method, since a pore structure in a underground rock stratum has strong nonuniformity and complexity, and is deep-buried underground, it is difficult for humans to directly monitor and quantitatively characterizing a whole immiscible fluids displacement-seepage process occurring in the pore structure, which results in significant difficulty in exploring displacement-seepage mechanism in a stratum.

At present, the displacement-seepage process in a complex structure of the stratum is explored mainly with the numerical simulation method and the laboratory experiment imaging method. A numerical model is established according to the fluid flow theory at pore scale, to replicate, in combination with related solving algorithms, interactions among immiscible fluids such as oil, gas and water in the pore structure of the stratum and interactions between fluids and rock wall, to explore the interfacial dynamics of immiscible fluids and an oil-gas displacement-seepage feature in the stratum that are caused by the interactions, so as to reveal the displacement-seepage mechanism within the complex structure in the stratum. However, the fluid flow theory adopted in the numerical method generally depends on macroscopic physical parameters measured in experiments, and it is difficult to completely present instabilities in the displacement-seepage process at micro-scale, specifically a speed jumping effect, a water locking effect, and a viscous fingering effect at pore scale. The experiment imaging method for a displacement-seepage process in a pore structure includes a computed tomography scan technology and a planar imaging method. With the computed tomography scan technology, a displacement-seepage process in a pore structure within an actual rock core is directly presented. However, it is required a time period of about 16 seconds to 30 minutes for each tomography scan on the rock core, and information of a displacement-seepage field during this time period is commonly lost, thus a dynamic real-time evolution process of an immiscible phase interface cannot be obtained. Further, accuracy of results obtained with such experiment method significantly depends on recognition result with an image processing algorithm on multi-phase fluids in the rock core.

A dynamic evolution process of the displacement-seepage in the pore structure may be obtained with the planar imaging method. A pore structure model used in the planar imaging method is generally formed by forming a pore structure on a silicon panel with a laser etching method and then splicing a glass cover plate. However, with the laser etching method, only two-dimensional and quasi two-dimensional pore structure are formed, while a natural complex structure cannot be fabricated. Further, the silicon panel may be burned with the laser etching method, which may result in geometric deviation of the pore structure. In addition, a problem of airtightness generally exists in such spliced model, especially in a splicing seam between an upper cover plate and a lower cover plate.

Therefore, a problem urgently to be solved by those skilled in the art is how to provide a widely used experiment system for visually presenting and quantitatively analyzing a whole immiscible displacement-seepage process in a complex three-dimensional pore structure within a natural rock mass.

SUMMARY

An object of the present disclosure is to provide an experiment system and a transparent experiment method for replicating a fluid displacement process within a pore structure of a natural rock mass. The experiment system is used widely and may be used to visually present a whole immiscible displacement-seepage process in a complex pore structure within a natural rock mass and quantitatively analyze distribution features of a seepage field and a speed field of immiscible displacement.

In order to achieve the above object, the following technical solutions are provided in the present disclosure.

A method for fabricating a three-dimensional pore structure model is provided in the present disclosure, which is used for reproducing a pore structure of a natural rock mass. The method includes: acquiring a structure image of a natural rock mass with a computed tomography scan technology or an imaging technology, where the structure image includes pore structure information of the natural rock mass; extracting pore structure information in the structure image and reconstructing a digital structure model corresponding to the natural rock mass with an image processing method; and printing, by a 3D printing device, the three-dimensional pore structure model with a transparent and visible internal structure based on the digital structure model.

The three-dimensional pore structure model printed based on the digital structure model includes a pore structure body formed by skeleton particles and a continuous physical external surface formed on periphery of the pore structure body. Two opposite ends on the physical external surface are respectively provided with a first opening and a second opening. The first opening is communicated with the second opening through the pore structure body.

Further, a three-dimensional pore structure model is provided in the present disclosure, which is formed with any one of the above methods for forming a three-dimensional pore structure model of a natural rock mass.

In addition, an experiment system for replicating a fluid displacement process within a pore structure of a natural rock mass is provided in the present disclosure, which includes the above three-dimensional pore structure model. The experiment system further includes a displacement-seepage controlling system, an imaging system and an analyzing system. The displacement-seepage controlling system includes a fluid displacement external-force system and a fluid temperature controlling system. The fluid displacement external-force system is configured to simulate parameters of a speed or/and a pressure of fluid in a stratum seepage process. The fluid temperature controlling system is configured to simulate a parameter of an external ambient temperature in the stratum seepage process. The imaging system includes a camera and is configured to capture and record interface evolution images of a fluid in the three-dimensional pore structure model at different time instants in a whole displacement-seepage process. The analyzing system is configured to acquire, based on the interface evolution images recorded by the imaging system and a prestored strategy, one or more of the following parameters: a structure feature of the pore structure of the natural rock mass, distribution features of a seepage field and a speed field of immiscible fluid displacement in the pore structure, and saturation of the fluid.

Based on the above experiment system, a transparent experiment method for replicating a fluid displacement process within a pore structure of a natural rock mass is provided in the present disclosure. The experiment method includes: fabricating a three-dimensional pore structure model with any one of the above methods; printing, based on the three-dimensional pore structure model, a splicing model with a 3D printing technology, and assembling the three-dimensional pore structure model and the splicing model together; arranging the three-dimensional pore structure model and the splicing model that are assembled together in a water tank containing dyed water, and arranging the water tank in a vacuum pump for a vacuum ambient, where air in three-dimensional pore structure model is exhausted based on a difference between air pressures inside and outside the three-dimensional pore structure model, to replicate a water saturation state in the pore structure of a stratum; arranging the three-dimensional pore structure model and the splicing model that are saturated with the dyed water in an airtight thermo-controlled oven, and connecting the splicing model to a fluid displacement external-force system via a connector structure; setting an ambient temperature and an inflow rate of a displacement fluid, and a pressure at an outlet of the three-dimensional pore structure model according to parameters designed for an experiment; and injecting the displacement fluid and turning on a light source and the camera to capture images of a whole immiscible displacement-seepage process, where the driving fluid is injected at a stable preset flow rate, to obtain a stable displacement-seepage boundary condition in the splicing model, and the displacement fluid flows into the three-dimensional pore structure model to displace the saturated water in the three-dimensional pore structure model, and in a case that a two-phase interface remains unchanged, the displacement fluid is stopped, and the light source, the camera, and the airtight thermo-controlled oven are turned off; and processing each frame of the images of the whole immiscible displacement-seepage process captured by the camera with an image processing method including at least a median filtering process and a threshold segmentation process, to obtain a phase distribution graph between immiscible fluids; calculating, based on a displacement interface dynamic evolution process shown in the obtained phase distribution graph, one or more of the following parameters: a shift of a fluid interface per time unit, a distribution feature of a speed field of the fluid, a proportion of each fluid of the phase distribution graph in the pore structure, a saturation of the fluid and a change tendency of the saturation with time and space, to quantitatively analyze distribution features of a seepage field and the speed field of fluid displacement by using the displacement fluid and the water, or the saturation of the fluid.

In the present disclosure, a pore structure of the natural rock mass is acquired with a computed tomography scan technology or an imaging technology. The pore structure is extracted and a digital structure model corresponding to the natural rock mass is reconstructed with the image processing method. Then, based on the digital structure model, a three-dimensional pore structure model with a transparent and visible internal structure is printed by a 3D printing device, such that the structure inside the three-dimensional pore structure model can be visible. In this way, the flow phenomenon of the fluid during the displacement-seepage process within the natural rock mass can be observed from the outside when performing the displacement-seepage experiment. Further, seepage images can be conveniently and rapidly captured by a camera outside the three-dimensional pore structure model, thereby significantly improving imaging efficiency, thus facilitating the acquisition of continuous dynamically varied images for the whole displacement-seepage process.

Further, during the experiment, a temperature, a flow rate, and a pressure of a displacement fluid as well as a temperature of the three-dimensional pore structure model can be accurately controlled by the displacement-seepage controlling system in the present disclosure, such that accurate replication in various experiment conditions can be realized, thereby significantly improving accuracy of experiment data and widening an application range of the experiment system. That is, the experiment system in the present disclosure is used widely and can be used to visually present a whole immiscible displacement-seepage process in a complex three-dimensional pore structure within the natural rock mass and quantitatively analyze distribution features of the seepage field and the speed field of the immiscible displacement.

BRIEF DESCRIPTION OF THE DRAWINGS

In FIGS. 1 to 3, references signs are listed as follows.

| 101 | three-dimensional pore structure model | | |
|---|---|---|---|
| 1011 | pore structure body | 1011a | pore structure |
| 1011b | physical structure | 1012 | first hollow pipeline |
| 1013 | second hollow pipeline | 102 | splicing module |
| 1021 | nested portion | 1022 | connector structure |
| 103 | fluid displacement external-force system | | |
| 1031 | first flux pump | 1032 | first pressure pump |
| 1033 | second flux pump | 1034 | second pressure pump |
| 104 | fluid temperature controlling system | | |
| 105 | imaging system | 1051 | camera |
| 1052 | light source module | | |

DETAILED DESCRIPTION OF EMBODIMENTS

The technical solutions in the embodiments of the present disclosure are described clearly and completely in combination with the method for fabricating a three-dimensional pore structure model, the experiment system and the experiment method, as well as drawings in the embodiments of the present disclosure hereinafter. It is apparent that the described embodiments are only some, rather than all of the embodiments of the present disclosure. All other embodiments obtained by those skilled in the art based on the embodiments of the present disclosure without any creative work should fall within the protection scope of the present disclosure.

Figure 1:
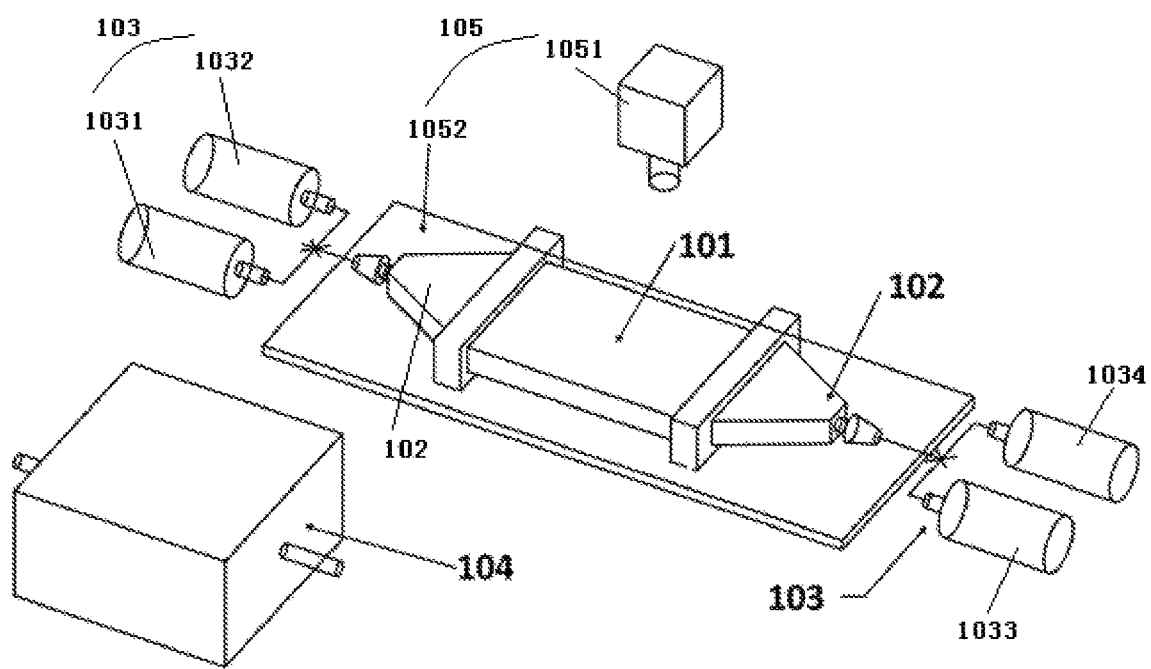
FIG. 1 is a schematic perspective view showing components of an experiment system for replicating a fluid displacement process within a pore structure of a natural rock mass according to an embodiment of the present disclosure.
Figure 2:
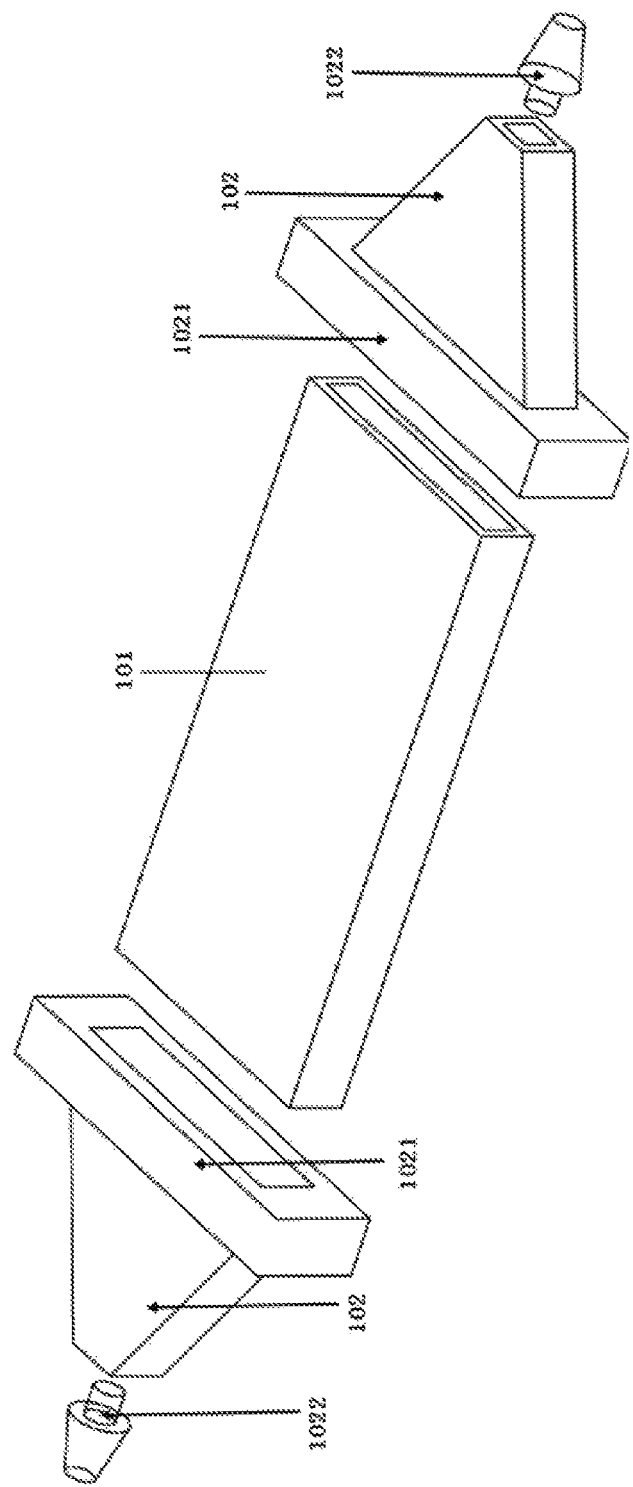
FIG. 2 is a schematic exploded view of a three-dimensional pore structure model and a splicing module shown in FIG. 1.
Figure 3:
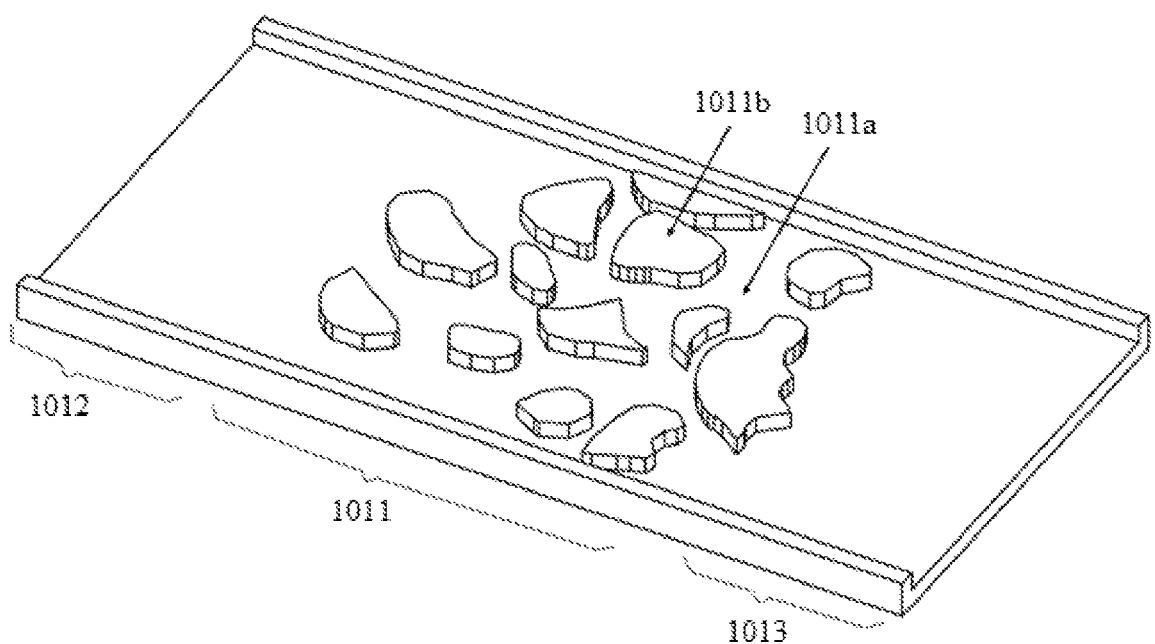
FIG. 3 is a schematic sectional view of a three-dimensional pore structure model according to an embodiment of the present disclosure.

Reference is made to FIGS. 1 to 3, an experiment system for replicating a fluid displacement process within a pore structure of a natural rock mass is provided in the present disclosure. Two fluids for performing displacement experiment are immiscible. In the present disclosure, oil phase and water phase are taken as research objects of the immiscible fluids displacement, to replicate an oil-water displacement process in a stratum after hydraulic fracturing operation is performed, to further describe the technical solutions and technical effects, where n-Hexadecane is taken as the oil phase, and deionized water is taken as the water phase.

A three-dimensional pore structure model 101 is configured to reproduce a structure of a natural rock mass, that is, a pore structure within a researched natural rock mass. The model is made of a transparent material, so that the internal pore structure is transparent and visible. That is, experiment personnel may observe a pore structure inside the three-dimensional pore structure model 101 from the outside. In the present disclosure, the three-dimensional pore structure model 101 is formed based on the extracted pore structure in a sandstone. In an embodiment, a colorless and transparent material of Vero Clear (which is a photosensitive resin) is taken as a skeleton material for the model. The transparent material is not limited to the Vero Clear, but may be other printable and transparent materials, as long as the visible effect can be realized.

Figure 4:
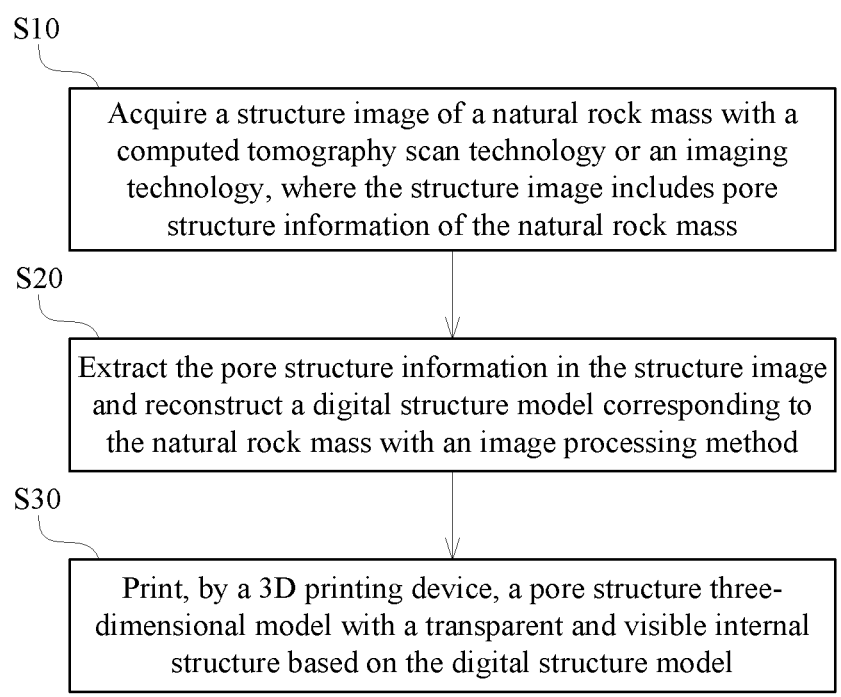
FIG. 4 is a flowchart of a method for forming a three-dimensional pore structure model according to the present disclosure.

Reference is further made to FIG. 4, the three-dimensional pore structure model may be fabricated with the following method, which includes the following steps S10 to S30.

In step S10, a structure image of a natural rock mass is acquired with a computed tomography scan technology or an imaging technology, where the structure image includes pore structure information of the natural rock mass.

Generally, in addition to the pore structure information of the natural rock mass, the structure image may further include other structure information of the natural rock mass or impurities.

In step S20, with an image processing method, pore structure information in the structure image is extracted and a digital structure model corresponding to the natural rock mass is reconstructed.

That is, the pore structure information in the structure image is extracted with the image processing method. The reconstructed digital structure model includes only a skeleton structure and pores inside the skeleton structure.

In step S30, by a 3D printing device, the three-dimensional pore structure model 101 with a transparent and visible internal structure is printed based on the digital structure model.

The three-dimensional pore structure model printed based on the digital structure model includes a pore structure body formed by skeleton particles, and a continuous physical external surface formed on periphery of the pore structure body. That is, the pore structure body is formed under the physical external surface. Two opposite ends on the physical external surface are respectively provided with a first opening and a second opening. The first opening is communicated with the second opening through the pore structure body. In an embodiment, the first opening is arranged preferably opposite to the second opening. The first opening and the second opening may have other position relationships, which may be determined according to actual experimental requirements.

In the experiment, the first opening and the second opening are each used to connect with an external pipeline, such that a displacement fluid can flow into the pore structure body via the first opening and a medium inside the pore structure body may flow to the external pipeline via the second opening.

At present, in a layered multi-material stereo forming system in a 3D printer, a photosensitive material is jetted on a reconstructing tray in an ultrathin layer form by using jetting technology, and the jetted photosensitive material solidifies by using ultraviolet light, to form a completely solidified model. In practice, no pore actually exists in the printed experiment model, and the printed pore structure is filled with a gelatinous support material and the support material cannot be removed, thus a three-dimensional experiment model having an available flow pipeline cannot be formed. However, in the present disclosure, the pore structure is filled with a chemically soluble support material when the model is printed by the 3D printer, and then the chemically soluble support material is removed by using a chemical cleaning liquid, such that a three-dimensional printed model having an available flow pipeline can be formed.

Specifically, in order to print the three-dimensional pore structure model, the pore structure body is made of both transparent skeleton particles and a soluble support material, and the physical external surface is made of the transparent skeleton particles. After printing, the support material is dissolved into a chemical solvent, and the dissolved support material is discharged to the outside via the first opening and the second opening under an ultrasonic wave.

In the present disclosure, SUP706 is used as the soluble support material to fill the pore structure of the printed model. The support material is removed by an ultrasonic cleaning device with alkaline solution. It is to be noted that, the three-dimensional pore structure model printed with the 3D printing technology has a transparent structure, and is widely used to form pore systems including man-made structures due to its good light transmittance and the feature of accurately reproducing natural complex pore structures, thereby effectively solving a current problem that the complex structure in the natural rock mass can be digitally presented while cannot be transparently presented in the experiment, thus overcoming a difficulty in transparently presenting and quantitatively characterizing a whole displacement-seepage process in the complex pore structure of the natural rock mass.

Further, there are difficulties in removing the support material due to the special properties of the three-dimensional pore structure model of the natural rock mass. Since the support material is filled in the small and complex pore structure, the cleaning liquid can not easily touch the support material inside the model, therefore, it is difficult to remove the support material, particularly the support material inside some "dead ends" in the complex pore structure, resulting in a difference between the 3D printed pore structure and a designed target pore structure. In view of this, the following solutions are further provided in the present disclosure.

In an embodiment, two ends on the physical external surface of the three-dimensional pore structure model printed based on the digital structure model are further respectively provided with a first hollow pipeline and a second hollow pipeline extending outward. The first opening and the second opening are respectively arranged at external ends of the first hollow pipeline and the second hollow pipeline.

That is, the pore structure model printed with the 3D printing technology is provided with openings, that is, a first hollow pipeline 1012 and a second hollow pipeline 1013 are respectively arranged on two ends of the three-dimensional pore structure model, to expose a large area of pore, so as to increase the contact area between the chemical cleaning liquid and the support material. Chemical reaction between the chemical cleaning liquid and the support material is intensified by controlling a temperature of the chemical cleaning liquid, and the support material, particularly the support material in the small pore and the "dead ends" can be rapidly separated from the skeleton structure under ultrasonic vibration.

In an embodiment, for a physical structure 1011b and a pore structure 1011a in a pore structure body 1011, reference may be made to FIG. 3. The pore structure body 1011 is a replicated pore structure of the natural rock mass. The physical structure 1011b is directly printed by using the skeleton material. The pore structure 1011a is printed by using the soluble support material, and then the soluble support material is removed by using the chemical solvent to form the pore structure.

Each of two ends of the pore structure body 1011 is arranged with a hollow pipeline having a large area, such that a gentle and stable two-phase interface can be formed before the oil flows into the pore structure.

An area of a cross section and a length of the first hollow pipeline 1012, an area of a cross section and a length of the second hollow pipeline 1013 may be calculated appropriately based on the pore structure, to obtain the optimum size for removing the support material.

For example, a cross section of the first hollow pipeline 1012, a cross section of the second hollow pipeline 1013, and a cross section of the periphery of the pore structure body may have the same size and shape, such as a rectangle, circle or the like.

Alternatively, the cross section of the first hollow pipeline 1012, the cross section of the second hollow pipeline 1013, and the cross section of the periphery of the pore structure body may have different sizes, and a ratio of area between the cross section of the first hollow pipeline to a cross section of the periphery of the pore structure body ranges from 0.5 to 2. The cross section of the first hollow pipeline and the cross section of the second hollow pipeline may be set to have the same shape.

Further, in order to reproduce the complex pore structure in the natural rock mass, the pore structure within the natural rock mass may be extracted, and the skeleton material may be added at a certain thickness to serve as a structure protective layer while geometrical morphology of the experiment model remains unchanged, so as to determine geometrical parameters of the experiment model.

Based on the above method, an experiment system for replicating a fluid displacement process within a pore structure of a natural rock mass is further provided in the present disclosure, which includes the three-dimensional pore structure model fabricated with the above method. The experiment system further includes a displacement-seepage controlling system, an imaging system and an analyzing system.

The displacement-seepage controlling system mainly includes a fluid displacement external-force system 103 and a fluid temperature controlling system 104. The fluid displacement external-force system 103 is configured to simulate parameters of a speed or a pressure of a fluid in a stratum seepage process. That is, the fluid displacement external-force system 103 may provide a flow rate and a pressure for a displacement fluid that are required in the experiment. The displacement fluid, under control of the fluid displacement external-force system 103, flows into the pore structure of the three-dimensional pore structure model 101 at the flow rate and the pressure that are required in the experiment, to displace a liquid originally in the pore structure.

The fluid temperature controlling system 104 is configured to simulate a parameter of an external ambient temperature in the stratum seepage process, which includes a temperature of the displacement fluid and a temperature of the three-dimensional pore structure model 101. In the present disclosure, the temperature of the displacement fluid and the temperature of the three-dimensional pore structure model 101 can be accurately controlled by the fluid temperature controlling system 104, thereby improving vraisemblance of analogue replication, thus improving the reliability of a subsequent research result.

In the present disclosure, an imaging system 105 includes a camera 1051 and is configured to capture and record interface evolution images of the fluid in the three-dimensional pore structure model 101 at different time instants in a whole displacement-seepage process. Therefore, it is required that the camera 1051 has a predetermined capturing accuracy, to reduce a time interval between two successive captured images. Preferably, a high-speed camera with a capturing accuracy greater than 1000 frames per second is used in the present disclosure. With the high-speed camera having a high resolution, a highly transparent three-dimensional model including a complex pore structure in a natural rock mass can be formed with a high accuracy, such that the whole displacement-seepage process in the model can be transparently presented. Further, the high-speed camera can acquire an instability phenomenon of a dynamic interface in a tiny time scale. That is, the high-speed camera can capture peculiar phenomena such as viscous fingering, capillary fingering, and speed jumping.

Finally, the interface dynamic evolution images in the whole displacement-seepage process may be acquired by an image processing system based on images acquired by the high-speed camera.

In the present disclosure, the analyzing system is configured to acquire, based on the interface evolution images recorded by the imaging system 105 and a prestored strategy, one or more of the following parameters: a structure feature of the natural rock mass with the pore structure, distribution features of a seepage field and a speed field of immiscible fluid displacement in the pore structure, and saturation of a fluid.

That is, the images recorded by the imaging system 105 are processed by the analyzing system, such that the whole immiscible displacement-seepage process in the complex pore structure within the natural rock mass can be obtained, thereby quantitatively analyzing distribution features of the seepage field and the speed field of immiscible phase displacement.

Based on the 3D printed transparent model for accurately reproducing a complex pore structure within the natural rock mass, details of the immiscible dynamic displacement-seepage process in the natural rock mass that is invisible and cannot be captured originally can be transparently presented by the displacement-seepage controlling system and the fluid temperature controlling system 104 in combination with the high-speed camera, to quantitatively characterize influences of stratum seepage conditions including a stratum pressure, a stratum temperature and a displacement flow rate on the displacement-seepage process in the stratum, so as to explore influences of complexity and nonuniformity of a natural pore structure on the dynamic evolution process of the immiscible fluid interface, which is significant for revealing oil-gas-water displacement-seepage mechanism in an unconventional deep-seated stratum. Specifically, by providing buffer regions including the first hollow pipeline 1012 and the second hollow pipeline 1013, instability of the displacement interface due to expansion at an inlet and an outlet can be further reduced, thereby obtain a smooth, flat and stable initial displacement interface.

It can be seen from the above, in the present disclosure, the pore structure within the natural rock mass is formed by the 3D printing device with the transparent material, such that the pore structure within the natural rock mass is transparent and visible. In this way, the flow phenomenon of the fluid during the displacement-seepage process within the natural rock mass can be observed from the outside when performing the displacement-seepage experiment. Further, seepage images can be conveniently and rapidly captured by a camera 1051 outside the three-dimensional pore structure model 101, thereby significantly improving imaging efficiency, thus facilitating the acquisition of continuous dynamically varied images for the whole displacement-seepage process. Further, during the experiment, a temperature, a flow rate, and a pressure of a displacement fluid as well as a temperature of the three-dimensional pore structure model can be accurately controlled by the displacement-seepage controlling system, such that replication in various experiment conditions can be performed accurately, thereby significantly improving accuracy of experiment data and widening an application range of the experiment system. That is, the experiment system in the present disclosure is used widely and can be used to visually present a whole immiscible displacement-seepage process in a complex three-dimensional pore structure within the natural rock mass and quantitatively analyze distribution features of the seepage field and the speed field of the immiscible displacement.

The first hollow pipeline 1012 and the second hollow pipeline 1013 each having a large area of cross section are helpful in removing the support material in the pore structure. However, the first opening and the second opening each having a large size are adverse to inflow of the fluid. Therefore, the following improvements are provided in the present disclosure.

In the above embodiments, each of the first opening and the second opening is provided with a splicing module 102 and is communicated with an external fluid pipeline via the splicing module 102. The splicing module 102 is a cone-shaped pipeline with a pipe diameter gradually increasing toward the openings. The cone-shaped pipeline facilitates injected fluid to smoothly flow from the fluid displacement external-force system 103 with a small opening to the three-dimensional pore structure model 101 with an inlet of a large cross section. The seepage is controlled by a pumping device with a small flow rate, to achieve a constant flow rate.

For conciseness of the description, in the present disclosure, the splicing module 102 arranged at the first opening is referred to as a first splicing module, and the splicing module 102 arranged at the second opening is referred to as a second splicing module. In the experiment, taking a case that the fluid flows in the three-dimensional pore structure model 101 via the first opening and flows out the three-dimensional pore structure model 101 via the second opening as an example, the first splicing module 102 guides a constant fluid flowing from the fluid displacement external-force system to flow into the first hollow pipeline 1012. In the first hollow pipeline 1012, an oil-water phase interface expands from an initial small cross section to a cross section with a size equal to that of a cross section of the pore structure three-dimensional model 101. The oil phase flows into the three-dimensional pore structure model 101 to displace the water phase in the three-dimensional pore structure model 101. After the displacement process is completed, the oil phase is discharged via the second hollow pipeline 1013 and the second splicing module 102. During a process of discharging the oil phase and the water phase, a pressure pump of the fluid displacement external-force system 103 provides a stable pressure.

The splicing module 102 may be printed by the 3D printing device. A fluid pipeline inside the splicing module 102 may also be printed with the soluble support material. After the printing process, the soluble support material is removed by using the chemical solvent, to form the fluid pipeline. In a preferred embodiment, the printed three-dimensional pore structure model 101 and the printed splicing module 102 are polished, to realize high transparency and surface flatness. In addition, sodium hydroxide, sodium silicate and deionized water are mixed with a predetermined mixing ratio to form the alkaline solution, and then the alkaline solution is injected into the ultrasonic cleaning device. The three-dimensional pore structure model 101 and the splicing module 102 that are printed by 3D printing device are placed in the ultrasonic cleaning device. With the ultrasonic vibration and the alkaline solution, the support material (for example, SUP706) inside the printed models can be rapidly removed. The models after being cleaned can accurately reproduce the designed complex pore structure and splicing structure.

The cone-shaped pipeline may be nestedly connected to the first hollow pipeline 1012 or the second hollow pipeline 1013, and then is sealed with a sealant layer circumferentially, thereby achieving airtightness of the experiment system. As shown in the drawings, the splicing module 102 includes a nested portion 1021. The nested portion 1021 is configured to hermetically nest with a corresponding hollow pipeline. For facilitating connection between the splicing module and the external pipeline, an external end of the splicing module 102 may be provided with a connector structure 1022. The connector structure 1022 may be provided referring to the conventional technology, and is not described in detail herein.

In the above embodiments, the fluid displacement external-force system 103 includes two flux and pressure components respectively arranged at the first opening and the second opening, to control the pressure and flux at each of the first opening and the second opening. Each flux and pressure component includes a flux pump and a pressure pump that are connected in parallel. The flux pump and the pressure pump are connected in parallel, and an outlet of the flux pump and an outlet of the pressure pump are both connected to the corresponding opening via the pipeline.

The flux pump is configured to control an inflow rate or an outflow rate at a corresponding opening. The pressure pump is configured to control a fluid pressure at a corresponding opening. In the experiment, whether to turn on the flux pump or the pressure pump is determined based on an experiment condition. For conciseness of describing the technical solutions, in the present disclosure, the flux pump and the pressure pump on a side of the first opening are respectively referred to as a first flux pump 1031 and a first pressure pump 1032. Accordingly, the flux pump and the pressure pump on a side of the second opening are respectively referred to as a second flux pump 1033 and a second pressure pump 1034. With the above two flux and pressure components, the following four experiment conditions may be realized. In a first experiment condition, the first flux pump 1031 and the second flux pump 1033 are turned on, and the first pressure pump 1032 and the second pressure pump 1034 are turned off. That is, flux control is performed on both the side of the first opening and the side of the second opening. In a second experiment condition, the first flux pump 1031 and the second pressure pump 1034 are turned on, and the first pressure pump 1032 and the second flux pump 1033 are turned off. That is, the flux control is performed on the side of the first opening and the pressure control is performed on the side of the second opening. In a third experiment condition, the first pressure pump 1032 and the second pressure pump 1034 are turned on, and the first flux pump 1031 and the second flux pump 1033 are turned off. That is, the pressure control is performed on both the side of the first opening and the side of the second opening. In a fourth experiment condition, the first pressure pump 1032 and the second flux pump 1033 are turned on, and the first flux pump 1031 and the second pressure pump 1034 are turned off. That is, the pressure control is performed on the side of the first opening, and the flux control is performed on the side of the second opening.

Taking an inlet as an example, the flux pump may provide a constant inflow rate, and the pressure pump may provide a constant pressure condition.

Alternatively, the flux and pressure component may perform the flux control and the pressure control in other manners, which are not described in detail herein.

In the above embodiments, the fluid temperature controlling system 104 may include an airtight thermo-controlled oven. The three-dimensional pore structure model 101 is arranged in the airtight thermo-controlled oven. At least one of a top plate and a base plate of the airtight thermo-controlled oven is made of a transparent thermal insulation material. The camera 1051 is arranged on a side of the top plate or the base plate of the airtight thermo-controlled oven that is made of the transparent thermal insulation material. The transparent thermal insulation material for the airtight thermo-controlled oven may be a quartz glass material, which has good transparency, thus facilitating the camera 1051 to capture the displacement process of the fluid.

The fluid temperature controlling system 104 may further includes a temperature controlling component configured to control a temperature inside the airtight thermo-controlled oven. The temperature controlling component may be a sensor, which may detect the temperature inside the airtight thermo-controlled oven, and transmit a detection signal to a controller of the fluid temperature controlling system 104.

It can be seen from the above description, in the present disclosure, the three-dimensional pore structure model 101 is completely arranged in the airtight thermo-controlled oven. In order to achieve accuracy of the experiment, the splicing module 102 may also be completely arranged in the airtight thermo-controlled oven, and is connected to the external-force system via only a through hole on the airtight thermo-controlled oven.

In this way, the three-dimensional pore structure model 101 may be arranged in a constant temperature ambient, a temperature of which may be determined based on a specific experiment condition. The displacement-seepage process may be performed on the medium in the three-dimensional pore structure model 101 at a constant temperature without being affected by the external ambient temperature, thereby improving accuracy of experiment.

In an embodiment, the fluid temperature controlling system 104 includes an airtight thermo-controlled oven. The three-dimensional pore structure model 101 and the splicing module are arranged in the airtight thermo-controlled oven. The airtight thermo-controlled oven is provided with a first connector and a second connector. The splicing modules on both sides are connected to external pipelines respectively via the first connector and the second connector. Each of a top plate and a base plate of the airtight thermo-controlled oven is made of a transparent thermal insulation material. The light source module 1052 is arranged opposite to the camera 1051. The light source module 1052 is arranged on an external surface of the base plate, and the camera 1051 is arranged on an external surface of the top plate.

In the above experiment system, the prestored strategy may include at least one of a pore structure feature analysis process and a whole displacement-seepage process analysis process.

In the pore structure feature analysis process, pore diameter feature distribution of the pore structure and nonuniformity characterization of the pore structure are analyzed with a maximum volume ball algorithm, and an absolute permeability of the pore structure is calculated with lattice Boltzmann method, to characterize a permeable capacity of the pore structure.

The displacement-seepage whole process analysis process is performed based on the images recording the whole displacement-seepage process that are captured by the imaging system 105. Each frame of the images is processed with an image processing method including at least a median filtering process and a threshold segmentation process to obtain a phase distribution graph of multiple groups of sub-fluids. A shift of a fluid interface per time unit is calculated based on a displacement interface dynamic evolution process shown in the phase distribution graph, to obtain the distribution feature of the speed field of the fluid. A proportion of each fluid of the phase distribution graph in the pore structure is calculated, to obtain the saturation of the fluid and a change tendency of the saturation with time and space.

Based on the above experiment system, an experiment method for replicating a fluid displacement process within a pore structure of a natural rock mass is further provided in the present disclosure. The experiment method includes the following steps S1 to S5.

In step S1, the three-dimensional pore structure model 101 is fabricated with any one of the above methods. Based on the three-dimensional pore structure model, the splicing model 102 is printed with the 3D printing technology. The three-dimensional pore structure model 101 and the splicing model are assembled together.

In an embodiment, the three-dimensional pore structure model is formed by performing the following steps a) and b).

In step a), a pore structure within a natural rock mass is extracted based on a distribution image of the pore structure acquired with the computed tomography scan technology. A three-dimensional digital model of the pore structure within the natural rock mass is reconstructed by means of the Mimics software. A size of the splicing model 102 provided in the present disclosure is scaled based on a geometric dimension of an experiment model having the pore structure, to create a three-dimensional digital model of the splicing model 102 by using AutoCAD. A cross section of a nested structure in the splicing model 102 need to match with that of the three-dimensional pore structure model in length and width, to achieve nested assembling manner.

In step b), the reconstructed three-dimensional digital model of the pore structure and the created three-dimensional digital model of the splicing model 102 are inputted to control software of the 3D printing device. Vero Clear may be used as the skeleton material (alternatively, other transparent material may also be used as the skeleton material). The pore structure and other fluid pipelines are filled with the support material SUP706. A surface of the printed model is polished. The support material SUP706 in the fluid pipelines is dissolved by using a mixed alkaline solution of sodium hydroxide and sodium silicate, and is removed in combination with the ultrasonic cleaning device. Next, the three-dimensional pore structure model 101 and the splicing model 102 are cleaned by using the deionized water, to remove residual mixed alkaline solution, and then the cleaned three-dimensional pore structure model 101 and the cleaned splicing model 102 are arranged in the airtight thermo-controlled oven for drying. After the drying process, each of the buffer regions respectively on the side of the inlet and the side of the outlet of the experiment model is spliced with the nested structure of the splicing model 102. In order to ensure airtightness of the splicing model 102, the buffer regions (that is, the first hollow pipeline and the second hollow pipeline) of the three-dimensional pore structure model are respectively coated with two layers of water-stop bands, and then are adhered with waterproof adhesive having high viscosity.

The support material is not limited to SUP706, as long as the support material can be dissolved by the chemical solvent and then can be removed to form the pore structure.

In order to facilitate the high-speed camera to capture the whole immiscible displacement-seepage process, a contrast between the oil phase and the water phase is enhanced by adding a coloring dye in the water phase. The technical solutions are described as follows.

In step S2, the three-dimensional pore structure model and the splicing model that are assembled together are arranged in a water tank containing dyed water, the water tank is arranged in a vacuum pump for a vacuum ambient, and air in the three-dimensional pore structure model is exhausted based on a difference between air pressures inside and outside the three-dimensional pore structure model, to replicate a water saturation state in the pore structure of a stratum.

In step S3, the three-dimensional pore structure model 101 and the splicing model 102 saturated with the dyed water are arranged in the airtight thermo-controlled oven. The splicing model is connected to the fluid displacement dynamical system 103 via the corresponding connector structure 1022.

The fluid displacement external-force system 103 mainly includes a flux pump and a pressure pump, a dynamic force for the fluid displacement is determined based on a condition of a replicated stratum. In this embodiment, the flux, to obtain a boundary constant flux condition at an inlet. The pressure pump is used to form a constant boundary pressure field at an outlet. The three-dimensional pore structure model 101 and the splicing model 102 are arranged in the airtight thermo-controlled oven, and the three-dimensional pore structure model 101 is connected to rigid interfaces on two sides of the airtight thermo-controlled oven via high temperature-resistant thin pipelines. The light source module is uniformly arranged on a bottom of the airtight thermo-controlled oven, to enhance light intensity of the fluid. The high-speed camera is arranged above the airtight thermo-controlled oven for capturing.

In step S4, an ambient temperature of the fluid is set according to parameters designed for an experiment. The light source and the camera 1051 are turned on for capturing. An inflow rate of the displacement fluid and a pressure at the outlet of the experiment model are set according to parameters designed based on the experiment. The displacement fluid, that is, the oil, is injected with a smooth flow rate, such that a stable displacement-seepage boundary condition can be obtained in the splicing model 102. The oil flows into the experiment model to displace the saturated water phase in the experiment model. During this process, the interface between the oil phase and the water phase evolves, and distribution features of the space and the speed field of the oil phase and the water phase changes, which are captured and imaged by the high-speed camera in real time. In a case that a certain amount of the oil phase is injected, the interface between the oil phase and the water phase remains unchanged. In this case, the displacement-seepage reaches a stable state. The injection of the displacement fluid is stopped, and the light source, the camera 1051, and the airtight thermo-controlled oven stops operating.

In step S5, each frame of the images of the whole displacement-seepage process of the immiscible fluid captured by the camera 1051 is processed with an image processing method including at least a median filtering process and a threshold segmentation process, to obtain a phase distribution graph of the immiscible fluid. Based on a displacement interface dynamic evolution process shown in the obtained phase distribution graph, a shift of a fluid interface per time unit is calculated, and a distribution feature of the speed field of the fluid is obtained. A proportion of each fluid of the phase distribution graph in the pore structure is calculated, a saturation of the fluid and a change tendency of the saturation with time and space are acquired, to quantitatively analyze the distribution features of the seepage field and the speed field of the displacement of the oil phase and the water phase as well as the statistical feature such as the saturation of the fluid.

Further, a three-dimensional pore structure model formed by with the above method is further provided in the present disclosure. Since the three-dimensional pore structure model is formed with the above method, the same technical effect can be realized, which is not repeated herein.

It should be noted that the above embodiments are only used to illustrate the present application and not intended to limit the technical solutions of the present disclosure. Although the present disclosure is described in detail with reference to the above embodiments, it should be understood by those skilled in the art that, various modifications and equivalents can be made to the technical solutions of the present disclosure without departing from the spirit and scope of the present application, all of which should be contained within the protection scope of the present application

The invention claimed is:

1. An experiment system for replicating a fluid displacement process within a pore structure of a natural rock mass, the experiment system comprising:
   a three-dimensional pore structure model;
   a displacement-seepage controlling system, wherein the displacement-seepage controlling system comprises: a fluid displacement external-force system configured to simulate parameters of a speed or/and a pressure of a fluid in a stratum seepage process, and a fluid temperature controlling system configured to simulate a parameter of an external ambient temperature in the stratum seepage process;
   an imaging system, wherein the imaging system comprises a camera and is configured to capture and record interface evolution images of a fluid in the three-dimensional pore structure model at different time instants in a whole displacement-seepage process; and
   an analyzing system configured to acquire, based on the interface evolution images recorded by the imaging system and a prestored strategy, one or more of the following parameters: a structure feature of the pore structure of the natural rock mass, distribution features of a seepage field and a speed field of immiscible fluid displacement in the pore structure, and saturation of the fluid, wherein
   the three-dimensional pore structure model is formed with a method comprising:
      acquiring a structure image of a natural rock mass with a computed tomography scan technology or an imaging technology, wherein the structure image comprises pore structure information of the natural rock mass;
      extracting pore structure information in the structure image and reconstructing a digital structure model corresponding to the natural rock mass with an image processing method; and
      printing, by a 3D printing device, the three-dimensional pore structure model with a transparent and visible internal structure based on the digital structure model, and wherein
      the three-dimensional pore structure model printed based on the digital structure model comprises a pore structure body formed by skeleton particles, and a continuous physical external surface formed on periphery of the pore structure body,
      two opposite ends on the physical external surface are respectively provided with a first opening and a second opening, and the first opening is communicated with the second opening through the pore structure body, and
      each of the first opening and the second opening is provided with a splicing module and is connected to an external fluid pipeline via the splicing module, and the splicing module is a cone-shaped pipeline with a pipe diameter increasing gradually in a direction toward the first opening and the second opening.

2. The experiment system for replicating a fluid displacement process within a pore structure of a natural rock mass according to claim 1, wherein the cone-shaped pipeline is nestedly connected to a first hollow pipeline or a second hollow pipeline, and is circumferentially sealed with a sealant layer.

3. The experiment system for replicating a fluid displacement process within a pore structure of a natural rock mass according to claim 1, wherein the imaging system further comprises a light source module, a capturing accuracy of the camera is greater than 1000 frames per second, and the light source module comprises a uniform light source.

4. The experiment system for replicating a fluid displacement process within a pore structure of a natural rock mass according to claim 3, wherein
   the fluid temperature controlling system comprises an airtight thermo-controlled oven, the three-dimensional pore structure model is arranged in the airtight thermo-controlled oven, and a top plate and a base plate of the thermo-controlled oven are made of a transparent thermal insulation material, and
   the light source module is arranged opposite to the camera, the light source module is arranged on an external surface of the base plate, and the camera is arranged on an external surface of the top plate.

5. The experiment system for replicating a fluid displacement process within a pore structure of a natural rock mass according to claim 1, wherein the prestored strategy comprises at least one of:
   a pore structure feature analysis process in which pore diameter feature distribution and nonuniformity characterization of the pore structure are analyzed with a maximum volume ball algorithm, and an absolute permeability of the pore structure is calculated with lattice Boltzmann method to characterize a permeable capacity of the pore structure; and
   a whole displacement-seepage process analysis process which is performed based on the images recording the whole displacement-seepage process that are captured by the imaging system, wherein
      each frame of the images is processed with an image processing method comprising a median filtering process and a threshold segmentation process to obtain a phase distribution graph of a plurality of sub-fluids;
      a shift of a fluid interface per time unit is calculated based on a displacement interface dynamic evolution process shown in the phase distribution graph, to obtain the distribution feature of the speed field of the fluid;

a proportion of each fluid of the phase distribution graph in the pore structure is calculated, to obtain the saturation of the fluid and a change tendency of the saturation with time and space.

6. The experiment system for replicating a fluid displacement process within a pore structure of a natural rock mass according to claim 1, wherein
the fluid displacement dynamical system comprises two flux and pressure components respectively arranged at the first opening and the second opening, to control a pressure and a flow rate at each of the first opening and the second opening; and
each of the two flux and pressure components comprises a flux pump and a pressure pump that are connected to each other in parallel, an outlet of the flux pump and an outlet of the pressure pump are both connected to a corresponding opening via a pipeline.

7. The experiment system for replicating a fluid displacement process within a pore structure of a natural rock mass according to claim 1, wherein
the fluid temperature controlling system comprises an airtight thermo-controlled oven, the three-dimensional pore structure model is arranged in the airtight thermo-controlled oven, and at least one of a top plate and a base plate of the airtight thermo-controlled oven is made of a transparent thermal insulation material, and
the fluid temperature controlling system further comprises a temperature controlling component configured to control a temperature inside the airtight thermo-controlled oven.

8. A transparent experiment method for replicating a fluid displacement process within a pore structure of a natural rock mass, comprising:
forming a three-dimensional pore structure model;
printing, based on the three-dimensional pore structure model, a splicing model with a 3D printing technology, and assembling the three-dimensional pore structure model and the splicing model together;
arranging the three-dimensional pore structure model and the splicing model that are assembled together in a water tank containing dyed water, and arranging the water tank in a vacuum pump for a vacuum ambient, wherein air in the three-dimensional pore structure model is exhausted based on a difference between air pressures inside and outside the three-dimensional pore structure model, to replicate a water saturation state in the pore structure of a stratum;
arranging the three-dimensional pore structure model and the splicing model that are saturated with the dyed water in an airtight thermo-controlled oven, and connecting the splicing model to a fluid displacement dynamical system via a connector structure;
setting an ambient temperature and an inflow rate of a displacement fluid, and a pressure at an outlet of the three-dimensional pore structure model according to parameters designed for an experiment, and injecting the displacement fluid and turning on a light source and a camera to capture images of a whole immiscible displacement-seepage process, wherein the displacement fluid is injected at a stable preset flow rate, to obtain a stable displacement-seepage boundary condition in the splicing model, and the displacement fluid flows into the three-dimensional pore structure model to displace the saturated water in the three-dimensional pore structure model, and in a case that a two-phase interface remains unchanged, the displacement fluid is stopped, and the light source, the camera, and the airtight thermo-controlled oven are turned off; and
processing each frame of the images of the whole immiscible displacement-seepage process captured by the camera with an image processing method comprising at least a median filtering process and a threshold segmentation process, to obtain a phase distribution graph between immiscible fluids; calculating, based on a displacement interface dynamic evolution process shown in the obtained phase distribution graph, one or more of the following parameters: a shift of a fluid interface per time unit, a distribution feature of a speed field of the fluid, a proportion of each fluid of the phase distribution graph in the pore structure, a saturation of the fluid and a change tendency of the saturation with time and space, to quantitatively analyze distribution features of a seepage field and the speed field of fluid displacement by using the displacement fluid and the dyed water, or the saturation of the fluid, wherein
the three-dimensional pore structure model is formed with a method comprising:
acquiring a structure image of a natural rock mass with a computed tomography scan technology or an imaging technology, wherein the structure image comprises pore structure information of the natural rock mass;
extracting pore structure information in the structure image and reconstructing a digital structure model corresponding to the natural rock mass with an image processing method; and
printing, by a 3D printing device, the three-dimensional pore structure model with a transparent and visible internal structure based on the digital structure model, and wherein
the three-dimensional pore structure model printed based on the digital structure model comprises a pore structure body formed by skeleton particles, and a continuous physical external surface formed on periphery of the pore structure body,
two opposite ends on the physical external surface are respectively provided with a first opening and a second opening, and the first opening is communicated with the second opening through the pore structure body.

9. The transparent experiment method for replicating a fluid displacement process within a pore structure of a natural rock mass according to claim 8, wherein, based on the digital structure model, the two ends on the physical external surface of the three-dimensional pore structure model are further respectively provided with a first hollow pipeline and a second hollow pipeline extending outward, the first opening and the second opening are respectively arranged at distal ends of the first hollow pipeline and the second hollow pipeline.

10. The transparent experiment method for replicating a fluid displacement process within a pore structure of a natural rock mass according to claim 9, wherein
a cross section of the first hollow pipeline, a cross section of the second hollow pipeline and a cross section of the periphery of the pore structure body have identical size and shape; or
a ratio of area between the cross section of the first hollow pipeline and the periphery of the pore structure body ranges from 0.5 to 2.

11. The transparent experiment method for replicating a fluid displacement process within a pore structure of a natural rock mass according to claim 8, wherein the forming the three-dimensional pore structure model comprises:

printing the pore structure body with transparent skeleton particles and a soluble support material, and printing the physical external surface with the transparent skeleton particles; and dissolving the soluble support material with a chemical solvent and discharging the dissolved soluble support material to the outside via the first opening and the second opening by means of an ultrasonic wave.

\* \* \* \* \*